(12) United States Patent
Zhang et al.

(10) Patent No.: US 11,018,979 B2
(45) Date of Patent: May 25, 2021

(54) SYSTEM AND METHOD FOR NETWORK SLICING FOR SERVICE-ORIENTED NETWORKS

(71) Applicant: Huawei Technologies Co., Ltd., Shenzhen (CN)

(72) Inventors: Nan Zhang, Beijing (CN); Ya-Feng Liu, Beijing (CN); Hamidreza Farmanbar, Ottawa (CA); Tsung-Hui Chang, Shenzhen (CN); Mingyi Hong, Ankeny, IA (US); Zhi-Quan Luo, Maple Grove, MN (US)

(73) Assignee: Huawei Technologies Co., Ltd., Shenzhen (CN)

( * ) Notice: Subject to any disclaimer, the term of this patent is extended or adjusted under 35 U.S.C. 154(b) by 34 days.

(21) Appl. No.: 16/557,169

(22) Filed: Aug. 30, 2019

(65) Prior Publication Data

US 2019/0394132 A1 Dec. 26, 2019

Related U.S. Application Data

(63) Continuation of application No. PCT/CN2017/078998, filed on Mar. 31, 2017.

(51) Int. Cl.
*H04L 12/24* (2006.01)
*H04L 12/803* (2013.01)
*H04L 12/729* (2013.01)
*H04L 12/717* (2013.01)

(52) U.S. Cl.
CPC ........ *H04L 47/125* (2013.01); *H04L 41/0803* (2013.01); *H04L 45/125* (2013.01); *H04L 45/42* (2013.01)

(58) Field of Classification Search
CPC . H04L 45/306; H04L 47/125; H04L 41/0803; H04L 45/125; H04L 45/42
See application file for complete search history.

(56) References Cited

U.S. PATENT DOCUMENTS

| 9,628,380 | B2 * | 4/2017 | Xia | H04L 45/12 |
| 2016/0261495 | A1 * | 9/2016 | Xia | H04L 45/12 |
| 2017/0104847 | A1 * | 4/2017 | Zhang | H04L 67/327 |
| 2017/0126416 | A1 * | 5/2017 | McCormick | H04L 12/1877 |
| 2017/0126792 | A1 * | 5/2017 | Halpern | G06F 9/5061 |

(Continued)

*Primary Examiner* — Wutchung Chu
(74) *Attorney, Agent, or Firm* — Slater Matsil, LLP

(57) ABSTRACT

A computing system and a method are provided for determining a network traffic routing path through a service function chain (SFC). A joint network slicing and traffic engineering problem is provided that may be solved to identify network slicing configuration and traffic engineering parameters to provide a set of function nodes, the SFC, and the network traffic routing path from the source node to the destination node. The joint network slicing and traffic engineering problem P may be solved by minimizing a resource objective associated with the joint network slicing and traffic engineering problem, in accordance with a set of one or more constraints. Instructions may be transmitted to a network orchestrator to create the service function chain in a network slice on the set of network nodes in accordance with the identified network slicing configuration and traffic engineering parameters, to provide the network traffic routing path.

24 Claims, 12 Drawing Sheets

(56) References Cited

U.S. PATENT DOCUMENTS

| | | | |
|---|---|---|---|
| 2017/0237657 A1* | 8/2017 | Rath | H04L 45/306 |
| | | | 709/238 |
| 2017/0317926 A1* | 11/2017 | Penno | H04L 45/64 |
| 2018/0091420 A1* | 3/2018 | Drake | H04L 45/38 |
| 2018/0123945 A1* | 5/2018 | Wang | H04L 45/64 |
| 2018/0152958 A1* | 5/2018 | Arnold | H04L 41/5025 |
| 2018/0159801 A1* | 6/2018 | Rajan | H04L 45/302 |
| 2018/0227221 A1* | 8/2018 | Starsinic | H04W 88/16 |
| 2018/0262431 A1* | 9/2018 | Zhang | H04L 47/125 |
| 2018/0262443 A1* | 9/2018 | Zhang | H04L 47/786 |
| 2019/0158997 A1* | 5/2019 | Starsinic | H04W 4/24 |
| 2019/0173778 A1* | 6/2019 | K | H04L 45/38 |
| 2019/0268232 A1* | 8/2019 | Garcia Azorero | |
| | | | H04L 47/2408 |

\* cited by examiner

SYSTEM AND METHOD FOR NETWORK SLICING FOR SERVICE-ORIENTED NETWORKS

CROSS-REFERENCE TO RELATED APPLICATIONS

This application is a continuation of PCT Application No. PCT/CN2017/078998, filed on Mar. 31, 2017, which application is hereby incorporated herein by reference.

TECHNICAL FIELD

The present application pertains to the field of communication networks and in particular to service-oriented networks.

BACKGROUND

Conventional telecommunications networks rely on expensive, specialized network hardware to provide specified services on the network. Network devices deployed in these networks are often purpose built. As a result, the purpose built devices are typically only able to accommodate limited changes or variation in service. As a result, the networks tend to be costly and inflexible to different service needs.

Proposed next generation communication works, such as fifth generation (5G) networks, seek to integrate various services for carriage on a single physical network. In order to avoid having to overprovision the entire network to support a number of services that for the most part will not each have similar requirements, customizable virtual networks can be created with separable handling operations for each service. The concept of such virtual networks, or a network slice, allows for logically isolated network partitions. Each network slice can be considered a unit of programmable resources such as network, connectivity, computation, and storage. By allowing for separate customizable network slices, a network service provider can create a number of network slices, each of which is capable of supporting one or more services. Services with similar traffic profiles can be assigned to the same network slice. A network slice associated with a network service can be considered to be "service-oriented". In order to support service-oriented networks, the dedicated physical components of the network can be replaced with flexible, more general purpose, network computing devices that may be programmed through software-based network functions to provide the desired functionality. This software defined topology (SDT) and software defined resource allocation (SDRA) provides for a flexible network that is able to provided differentiated services on each network slice.

A service-oriented network has the flexibility to dedicate different resource allocations to each network slice, providing for more varied service support as compared with conventional packet switching networks. For instance, real time machine-type communications may be accommodated by providing for an ultra-low transport latency on a dedicated high priority network slice. Conversely, low priority communications, such as utility meter report communications, may be accommodated on low priority network slices that allow low priority communications to be delayed to accommodate ultra-low transport latency communications on the service-oriented network.

While the promise of increased flexibility allows for greater service variation, higher data throughput capacity, and the support for new services, it does raise complications. In order to support network slicing, a next generation network may be required to support the routing of data traffic such that each data flow is processed in the order defined in a corresponding service function chain (SFC). In order to route data traffic on a service-oriented network, two problems must be resolved: 1) which physical network nodes may be selected to act as, or to host, functions (referred to as function nodes) operative to process the data traffic, which involves placement of the virtual network functions and virtual links of a network slice across the physical nodes; and, 2) how to route the data traffic flow through the network of selected function nodes. These two problems may be referred to as the "network slicing" problem, and the "traffic engineering" problem.

Prior art methods for routing data traffic have considered these two problems in isolation. In cases where the two problems are considered, the model is overly simplified to consider, for instance one-hop routing, and/or fixing the physical path through a predetermined path set. These simplifications rely on the assumption that that instantiation of a service function for a flow can be arbitrarily split over multiple nodes. This constraint unnecessarily increases communication overhead, and as a result leads to a sub-optimal solution for many practical cases.

Therefore, there is a need for a system and method for data traffic routing in next generation networks that is not subject to one or more limitations of the prior art.

This background information is provided to reveal information believed by the applicant to be of possible relevance to the present application. No admission is necessarily intended, nor should be construed, that any of the preceding information constitutes prior art against the present application.

SUMMARY

In a first aspect of the present invention, a method is provided for determining a network traffic routing path from a source node to a destination node through a service function chain (SFC). The method comprising: determining a joint network slicing and traffic engineering problem that may be solved to identify network slicing configuration and traffic engineering parameters to provide a set of function nodes, the SFC, and the network traffic routing path from the source node to the destination node; solving the joint network slicing and traffic engineering problem P by minimizing a resource objective associated with the joint network slicing and traffic engineering problem, in accordance with a set of one or more constraints; and, transmitting instructions to a network orchestrator to create the service function chain in a network slice on the set of function nodes in accordance with the identified network slicing configuration and traffic engineering parameters, to provide the network traffic routing path.

In second aspect of the present invention, a computing system operative to determine a network traffic routing path from a source node to a destination node through a service function chain (SFC) is provided. The computing system comprising: a processor; a non-transitory memory for storing instructions that when executed by the processor cause the computing system to: determine a joint network slicing and traffic engineering problem that may be solved to identify network slicing configuration and traffic engineering parameters to provide a set of function nodes, the SFC, and the network traffic routing path from the source node to the destination node; solve the joint network slicing and traffic engineering problem P by minimizing a resource objective associated with the joint network slicing and traffic engineering problem, in accordance with a set of one or more constraints; and, transmit instructions to a network orchestrator to create the service function chain in a network slice on the set of function nodes in accordance with the identified network slicing configuration and traffic engineering parameters, to provide the network traffic routing path. In embodiments of the first and second aspects, the method is performed by a controller network function executed on a computing resource available on the network. In other embodiments, an identity of at least one of: the source node; the destination node; and, a set of available function-nodes; is provided to the controller by the network orchestrator. In a further embodiment, the joint network slicing and traffic engineering problem P comprises a Mixed Integer Linear Program. In other embodiments the resource objective comprises at least one of: one or more link rates; total computational capacity of the function nodes in the SFC; total communication cost associated with traversing the SFC; minimum number of function nodes in the SFC; and, a combination of the above objectives. In further embodiments, the resource objective comprises a summation of the link rates through the SFC, and wherein the objective function comprises: $g(r)=\Sigma_k\Sigma_{ij}r_{ij}(k)$. In other embodiments, the set of one or more constraints includes at least one of: a rate of the flow k on a link being equal to the sum of rates of virtual flows over the link $r_{ij}(k)=\Sigma_{s=0}{}^n r_{ij}(k,f_s{}^k)$; each function is provided by a single function node: $\Sigma_{i \in V_f}x_{i,f}(k)=1$; a link capacity constraint; a node capacity constraint; a node capacity constraint that is expressed as a limit on the data rate $\lambda(k)$ for flows processed by the function node: $\Sigma_k\Sigma_f x_{i,f}(k)\lambda(k) \le \mu_i$; and a flow conservation constraint applied at one or more of the source node $\Sigma_j r_{s(k)j}(k,f_0{}^k)=\lambda(k)$; the destination node $\Sigma_j r_{jD(k)}(k,f_n{}^k)=\lambda(k)$ and at adjacent nodes in the SFC $\Sigma_j r_{ji}(k,f_{s-1}{}^k) \Sigma_j r_{ij}(k,f_{s-1}{}^k)=x_{i,f_s{}^k}(k)\lambda(k)$, and $\Sigma_j r_{ji}(k,f_s{}^k)-\Sigma_j r_{ij}(k,f_s{}^k)=x_{i,f_s{}^k}(k)\lambda(k)$.

In other embodiments, the joint network slicing and traffic engineering problem P is solved by allowing binary variables to take on real values. In further embodiment, the joint network slicing and traffic engineering problem P is solved by adding a penalty term $P_{\in}(\bar{x})=\Sigma_k\Sigma_{f\in F(k)}(\|\bar{x}_f(k)+\in 1\|_p{}^p-c_{\in,f})$. In some embodiments, the penalty term is differentiable and has a minimum value of 0.

In further embodiments, the minimizing the resource objective is considered complete, when at least one of the following conditions are satisfied: $T_{max}$ minimization iterations have been performed; when one or more real variables of the joint network slicing and traffic engineering problem have been resolved to binary components; when one or more real variables of the joint network slicing and traffic engineering problem have been resolved to values close to a binary component binary components; and, when one or more real variables of the joint network slicing and traffic engineering problem have been resolved to values within a pre-defined range of a binary component.

In other further embodiments, solving the joint network slicing and traffic engineering problem P comprises: relaxing the joint network slicing and traffic engineering problem P by allowing binary variables to assume real values and adding a penalty term to the objective; solving the relaxed and penalized problem P to generate $X^t$; calculating an iteration of the (PSUM) subproblem $\nabla P_{\in}(X^t)^T X$; solving the subproblem $\nabla P_{\in}(X^t)^T X$; checking to determine if the algorithm is complete and if it is not complete calculating the next iteration of the (PSUM) subproblem $\nabla P_{\in}(X^t)^T X$, and if it is complete, outputting the complete solution.

BRIEF DESCRIPTION OF THE DRAWINGS

Further features and advantages will become apparent from the following detailed description, taken in combination with the appended drawings, in which.

It will be noted that throughout the appended drawings, like features are identified by like reference numerals.

DETAILED DESCRIPTION OF ILLUSTRATIVE EMBODIMENTS

In an implementation, a system and method is provided for routing data traffic on service-oriented networks that provides a joint solution for the combination of the network slicing problem and the traffic engineering problem.

Figure 1:
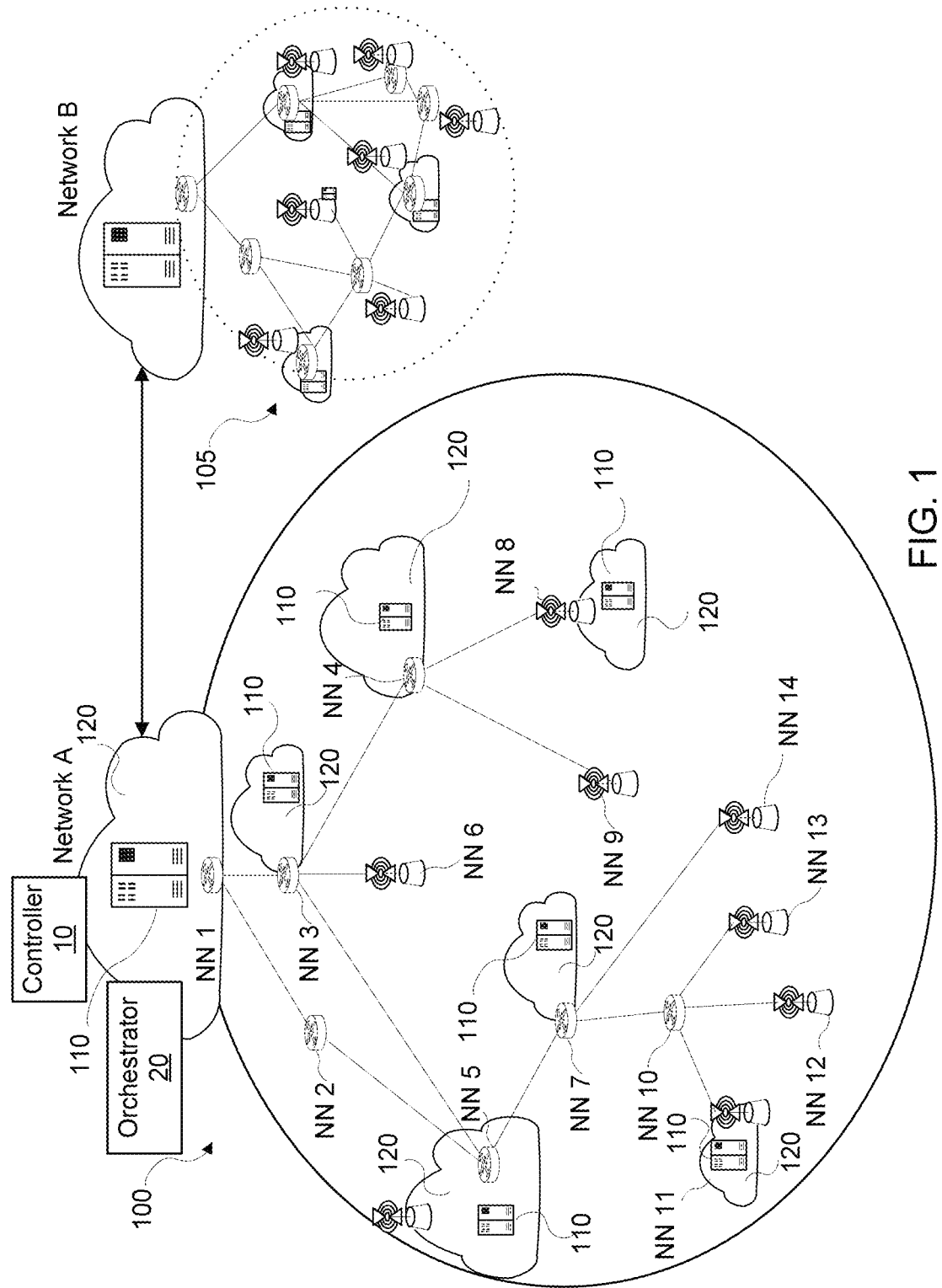
FIG. 1 is a network diagram illustrating a simplified example of an embodiment of a service-oriented network.

FIG. 1 is a network diagram illustrating a simplified example of an embodiment of a service-oriented network A 100 in communication with a Network B 105. Network A 100 and Network B 105 are illustrated as being hierarchical for illustrative purposes, however other network topologies are also possible. In the figure, a plurality of network nodes NN1 ... NN14 are illustrated in Network A 100 making up the physical locations of each physical node of Network A 100. Some or all of the network nodes may comprise cloud computing nodes 120, illustrated with computing resources 110, which available to support a service or set of services. It will be appreciated that in some implementations all of the network nodes NN1 ... NN14 may comprise computing nodes 120. In some implementations, only some of the network nodes NN1 ... NN14 may comprise computing nodes 120. In some implementations, only some of the network nodes NN1 . . . NN14 may comprise computing nodes 120 available for some services supported by the Network A 100.

Network B 105 is another network, or another domain of a larger network, that is connected to Network A 100. In some implementations, the services supported by Network A 100 may include a gateway to Network B 105. In some implementations, the services supported by Network A 100 may extend onto Network B 105.

In the embodiment of FIG. 1, NN1 of Network A 100 includes an orchestrator 20 and a controller 10. The orchestrator 20 and controller 10 typically being implemented as network functions in the form of program code executable by one or more processors of computing resources available at one or more network nodes NN1 . . . NN14. The orchestrator 20 and controller 10 may be implemented as separate functions, as illustrated here, or may be combined into a combined function or set of functions.

The orchestrator 20 is responsible for defining and establishing network slices on Network A 100. In some implementations, the orchestrator 20 may further be extended to other network nodes NN1 . . . NN14. In some implementations, a plurality of orchestrators 20 may be provided at a corresponding plurality of network nodes NN1 . . . NN14.

Various network nodes NN1 . . . NN14 may comprise general purpose hardware that are customizable in software to provide network services. Some network nodes, such as NN5, NN6, NN8, NN9, NN11, NN12, NN13, NN14 may comprise specialized hardware to support access node functionality. In the embodiment of FIG. 1, for instance, the access nodes comprise radio access nodes (R)AN operative to provide wireless connectivity to the Network A 100 and some network nodes may provide routing services. Network nodes may also comprise a combination of general purpose hardware and specialized hardware as may be required for a particular implementation.

When a network slice is to be established for a data traffic flow, the orchestrator 20 can determine the network node locations and sequence of network functions that support a network slice. The sequence of network functions is referred to as a service function chain (SFC). In the embodiment of FIG. 1, it is the task of the controller 10 to solve the joint network slicing problem and traffic engineering problem in order to support the orchestrator 20 in establishing and maintaining network slices. The controller 10 solves the joint problem and directs the orchestrator 20 regarding which of the network nodes NN1 . . . NN14 are to be selected to act as function nodes operative to support the network slice (i.e. "network slicing") and the data traffic routing through those selected function nodes (i.e. "traffic engineering").

Figure 2:
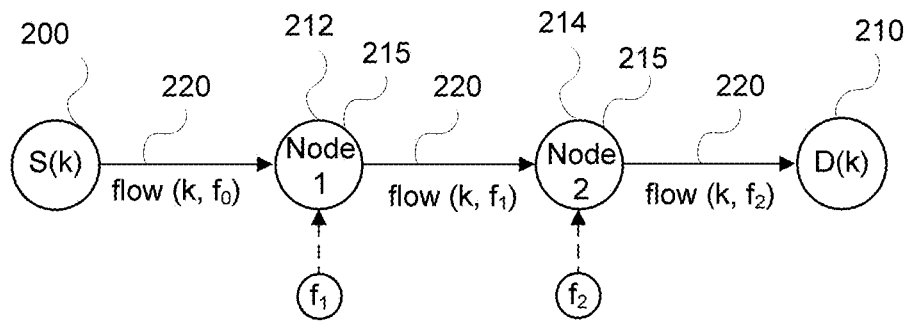
FIG. 2 is a network node diagram illustrating an embodiment of a SFC model.

Referring to FIG. 2, an embodiment of a SFC model is presented. The SFC through which a flow k is sent is represented by a set of s functions, k: $F(k)=(f_1^k, \ldots, f_s^k, \ldots, f_n^k)$. In the model, flow k is to be transmitted at a data rate $\lambda(k)$ across i network nodes starting from a source node S(k) 200 and terminating at a destination node D(k) 210. Between the source node S(k) 200 and the destination node D(k) 210, are n network nodes operative to act as function nodes 215 (which may be logical entities within a network slice) selected from the set of available function nodes $V_f$, each responsible for carrying out a network function $f_s$. In the embodiment of FIG. 2 n=2 and there are two function nodes 215: function node 1 212 and function node 2 214. The computational capacity of each of the n function nodes 215, i.e. the "node capacity", is represented as $\mu_i$. A binary variable $x_{i,f}(k)$ can indicate whether function node i provides function f for flow k. In this embodiment, the source node S(k) 200 and the destination node D(k) 210 do not provide for any functions operative on the flow k. In some embodiments, the source node S(k) 200 and/or the destination node D(k) 210 may provide for one or more functions operative on the flow k.

A virtual flow $(k,f_s)$ denotes the flow k that has been processed by the $s^{th}$ function $f_s$ in the SFC. The rate of flow k on link (i,j) 220 in the flow path is $r_{ij}(k)$, and the rate of the virtual flow $(k,f_s)$ on link (i,j) 220 is represented as $r_{ij}(k,f_s)$, with the flow through the first link being described as $(k,f_o)$ with none of the functions F(k) having operated on the flow at that point. Accordingly, the rate of flow k on link (i,j) 220 and the rate of the virtual flow $(k,f_s)$ on link (i,j) are related by the expression:

$$r_{ij}=\Sigma_{s=0}^{n} r_{ij}(k,f_s^k) \quad (1)$$

Because it is assumed that there are is no splitting of a network function across function nodes, each function f∈F(k) is provided by a single function node 215. Accordingly, the sum of the binary variable $x_{i,f}(k)$ for all function nodes 215 is 1:

$$\Sigma_{i \in V_f} X_{i,f}(k)=1 \quad (2)$$

A link capacity constraint that defines the maximum flow rate over link (i,j) 220 may be specified:

$$\Sigma_k r_{ij}(k) \leq C_{ij} \quad (3)$$

A node capacity constraint. In some implementations, the node capacity constraint may be expressed in terms of the data rate $\lambda(k)$ for flows that have been processed by the function node:

$$\Sigma_k \Sigma_f x_{i,f}(k)\lambda(k) \leq \mu_i \quad (4)$$

Conservation of flow may be applied to derive constraints for the flow at the source node S(k) 200, the destination node D(k) 210, and the n function nodes 215. In particular, the flow at both the source node S(k) 200 and the destination node D(k) 210 must equal the data rate $\lambda(k)$. Similarly, the flow through the n function nodes 215 must satisfy the flow condition at the boundaries and only flow through the utilised n function nodes 215.

S(k) flow conservation constraint:

$$\Sigma_j r_{S(k)j}(k,f_0^k)=\lambda(k) \quad (5)$$

D(k) flow conservation constraint:

$$\Sigma_j r_{jD(k)}(k,f_n^k)=\lambda(k) \quad (6)$$

Function node flow conservation constraints:

$$\Sigma_j r_{ji}(k,f_{s-1}^k) - \Sigma_j r_{ij}(k,f_{s-1}^k) = x_{i,f_s^k}(k)\lambda(k) \quad (7)$$

$$\Sigma_j r_{ij}(k,f_s^k) - \Sigma_j r_{ji}(k,f_s^k) = -x_{i,f_s^k}(k)\lambda(k) \quad (8)$$

Based on the above relations and constraints, the joint network slicing and traffic engineering problem may be expressed as:

$$(P) \min_{r,x} g$$

Subject to constraints (1)-(8) above, as well as:

$$r_{ij}(k) \geq 0, r_{ij}(k,f) \geq 0, \forall (i,j), k, f$$

$$x_{ij}(k) \in \{0,1\}, \forall k, f, i$$

The objective function g is a resource objective associated with network slicing and traffic engineering including, without limitation, one or more link rates in the SFC, a total computational capacity in the function nodes supporting the functions in the SFC, a communication cost associated with traversing the SFC within a network slice, a minimum number of function nodes to support the SFC and connect the source node to the destination node, or a combination of the above. In this example the objective g is a summation of the link rates through the SFC:

$$g(r) = \Sigma_k \Sigma_{ij} r_{ij}(k)$$

The above joint network slicing and traffic engineering problem (P) is a mixed integer linear program, which in some embodiments has a feasibility proven as NP-complete. It may also be NP-Hard, regardless of which objective function, or combination of objective functions, is used.

In a first embodiment, a solution to the problem P may be efficiently achieved through the inventors' "PSUM" algorithm (which will be discussed below, and in particular with respect to FIG. 3A) by relaxing the requirements of the binary variables to be either 1 or 0 to allow them to be real values, and by adding to the objective function a penalty term up to constant $C_{\epsilon,f}$. The penalty term being differentiable and taking a minimum value of 0. The binary components of an optimal solution of the relaxed and penalized problem may end up being binary at the optimal solution.

Let $$\bar{x}_k = \{x_{i,j}(k)\}_{i \in V_f},$$

Then $$\|\bar{x}_f(k)\|_1 = 1$$

$l_p$-norm function:

$$\|x\|_p = (|x_1|^p + \ldots + |x_n|^p)^{1/p} (0 < p < 1)$$

Penalty term:

$$P_\epsilon(\bar{x}) = \Sigma_k \Sigma_{f \in F(k)} (\|\bar{x}_f(k) + \in \bar{1}\|_p^p - c_{\epsilon,f})$$

With the relaxation of the binary values, and the addition of a penalty term, a penalized problem may be derived:

$$\min_{z=(\bar{r},X)} g_\sigma(z) = g(\bar{r}) + \sigma P_\epsilon(\bar{X})$$

Subject to constraints (1)-(8) above, and $$r_{ij}(k) \geq 0, r_{ij}(k,f) \geq 0, \forall (i,j), k, f$$

$$x_{ij}(k) \in \{0,1\} \forall k, f, i$$

Applying a convergence analysis to the penalized problem it can be assumed that the positive sequence $\{\sigma_t\}$ is monotonically increasing and $\sigma_{t \to +\infty}$, and $\bar{z}^t$ is a global minimizer of the penalized problem with the objective function $g_{\sigma_t}(\bar{z})$. Then any limit point of $\{\bar{z}^t\}$ is a global minimizer of the problem P.

As the penalized problem is not convex, a successive upper bound minimization approach may be used to find an optimal solution. In particular, a sequence of approximate objective functions may be solved:

$$P_\epsilon(\bar{X}) \leq P_\epsilon(\bar{X}^t) + \nabla P_\epsilon(\bar{X}^t)^T(\bar{X} - \bar{X}^t)$$

Based on this, the PSUM subproblem (in the t+1$^{st}$ iteration) may be framed as a linear program. If an iteration of PSUM returns an integer solution with an objective value being equal to $g_{LP}^*$, the lower bound of the optimal value of the $l_p$ relaxation problem P where the binary values are relaxed, then the solution must be a global optimal solution:

$$\min_{\bar{r}, X} g(\bar{r}) + \sigma_{t+1} \nabla P_\epsilon(\bar{X}^t)^T \bar{X}$$

Subject to constraints (1)-(8) above, and $$r_{ij}(k) \geq 0, r_{ij}(k,f) \geq 0, \forall (i,j), k, f$$

$$x_{ij}(k) \in \{0,1\}, \forall k, f, i$$

Figure 3A:
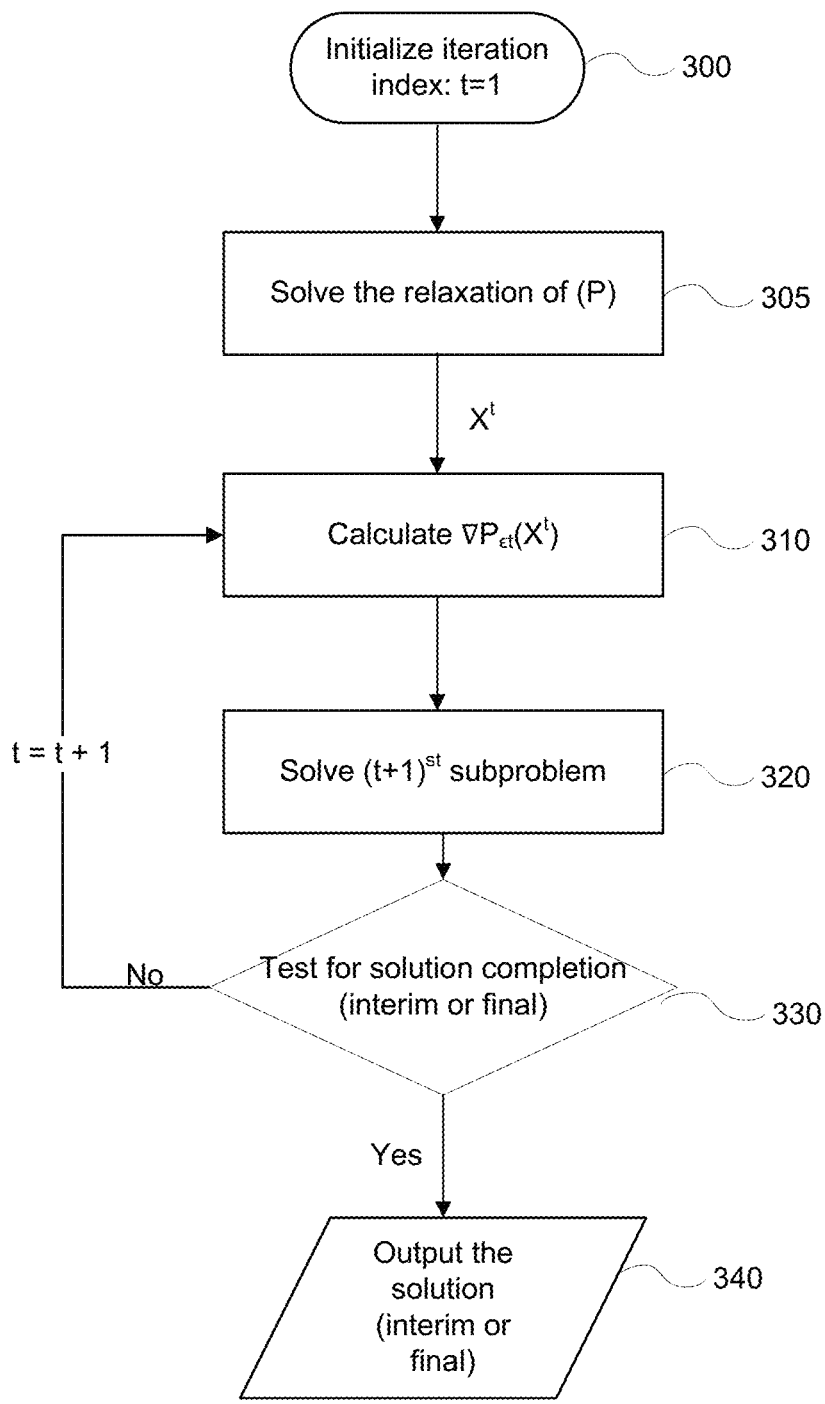
FIG. 3A is a process flow diagram illustrates an embodiment of the PSUM algorithm.

Referring to FIG. 3A, a process flow diagram illustrates an embodiment of the PSUM algorithm. In initial step 300 the iteration index t may be set equal to 1. In step 305 solve for the relaxation of problem P by changing the binary variable to a real number to produce $\bar{X}^t$. In step 310, calculate $\nabla P_\epsilon(\bar{X}^t)$. In step 320, solve the t+1$^{st}$ PSUM subproblem. In step 330, test for solution completion. If the solution is not complete, then the iteration index is incremented, and the process returns to step 310. If the solution is complete, then in step 340 the solution may be outputted for use by the orchestrator 20 if it is a final solution, or for further processing if it is an interim solution as is described below.

In an embodiment, the solution is complete when sufficient minimizing iterations have been processed to solve for all of the binary components to produce a final solution. In an embodiment, the solution is 'complete' when a pre-defined maximum number of minimizing iterations, i.e. after q minimizing iterations $t = T_{max}$, have been processed to reach an interim solution that may be output for further processing to reach a final solution. In some embodiments, an interim solution is considered complete when, after q minimizing iterations, a pre-defined number of relaxed real variables have been resolved to binary values. In some embodiments, an interim solution is considered complete when, after q minimizing iterations, a pre-defined number of relaxed real variables have been resolved to real values within a pre-defined range of a binary value. In some embodiments, the pre-defined range is relatively small such that it is likely the real value would resolve to the binary value given sufficient further minimizing iterations >q. When the relaxed real variables have been resolved to real values within a pre-defined range of a binary value, the resolved values may be rounded to the binary value that they would likely resolve to in time, with sufficient further minimizing iterations.

In an embodiment, the PSUM algorithm may be extended as a PSUM-R(ounding) algorithm to allow for resource violation(s) in order to direct the algorithm to faster convergence. In some implementations, the resource violation may comprise rounding real values that have been resolved within a pre-defined range of a binary value to that binary value. In some implementations, the resource violation may comprise identifying an available function node $j \in V_f$ with a maximum remaining computational capacity as compared with the other available function nodes, and fixing function node j to provide a function for flow k. In some implementations, the resource violation comprises fixing the values of the binary variables, and solving problem (P) with an objective $g + \tau \Delta$, the link capacity constraint being modified to allow for a resource violation of $\Delta$, with a weight of $\tau$ in the objective function g. The link capacity constraint being modified to $\Sigma_k r_{ij}(k) \leq c_{ij} + \Delta, \forall (i,j)$. In these implementations, the resource violation allows for limited violation of the link capacities to assist in simplifying the problem.

Figure 3B:
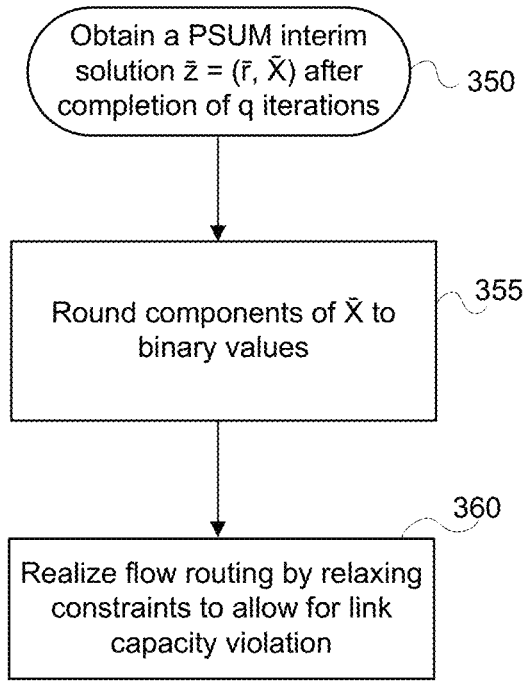
FIG. 3B, a simplified process flow diagram illustrates the main steps in an embodiment of a PSUM-R algorithm.

Referring to FIG. 3B, a simplified process flow diagram illustrates the main steps in an embodiment of a PSUM-R algorithm. In this embodiment, both resource violation techniques are applied, though as discussed above in some embodiments one or more of the resource violation techniques may apply and depending upon the objective function one or more resource constraints may be relaxed. In step 350, an interim solution $\bar{z}=(\bar{r}, X^-)$ is obtained after completion of q minimizing iterations of the PSUM algorithm described above and output in step 340 of FIG. 3A. As discussed, the interim solution may be obtained when, after q minimizing iterations, a pre-defined number $T_{max}$ minimizing iterations have passed or a pre-determined number of real values have resolved to within a pre-defined range of a binary variable. In step 355, the real values of $X^-$ are rounded to binary values. As indicated above, in some embodiments the real values of $X^-$ are only rounded to binary values if they are within a pre-defined range of a binary value (e.g. if a component of $X^- \approx 1$, $X^- \approx 0$). In step 360, flow routing (i.e. traffic engineering) may be determined by relaxing at least one resource constraint. In the example of FIG. 3B, the resource constraint being violated is the link capacity.

Figure 4A:
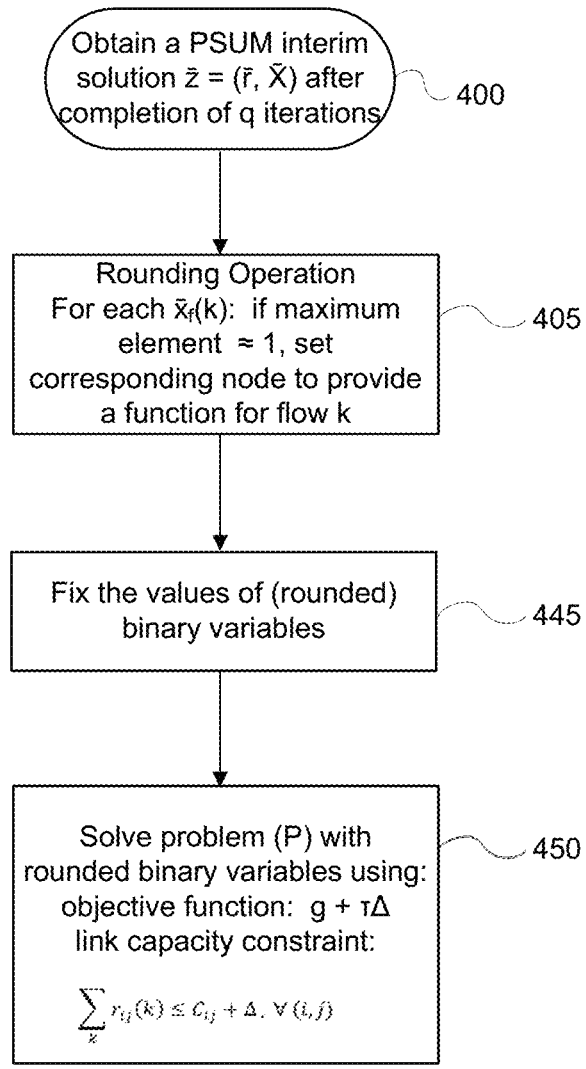
FIGS. 4A, 4B, 4C are simplified process flow diagrams illustrating embodiments of a PSUM-R algorithm.
Figure 4B:
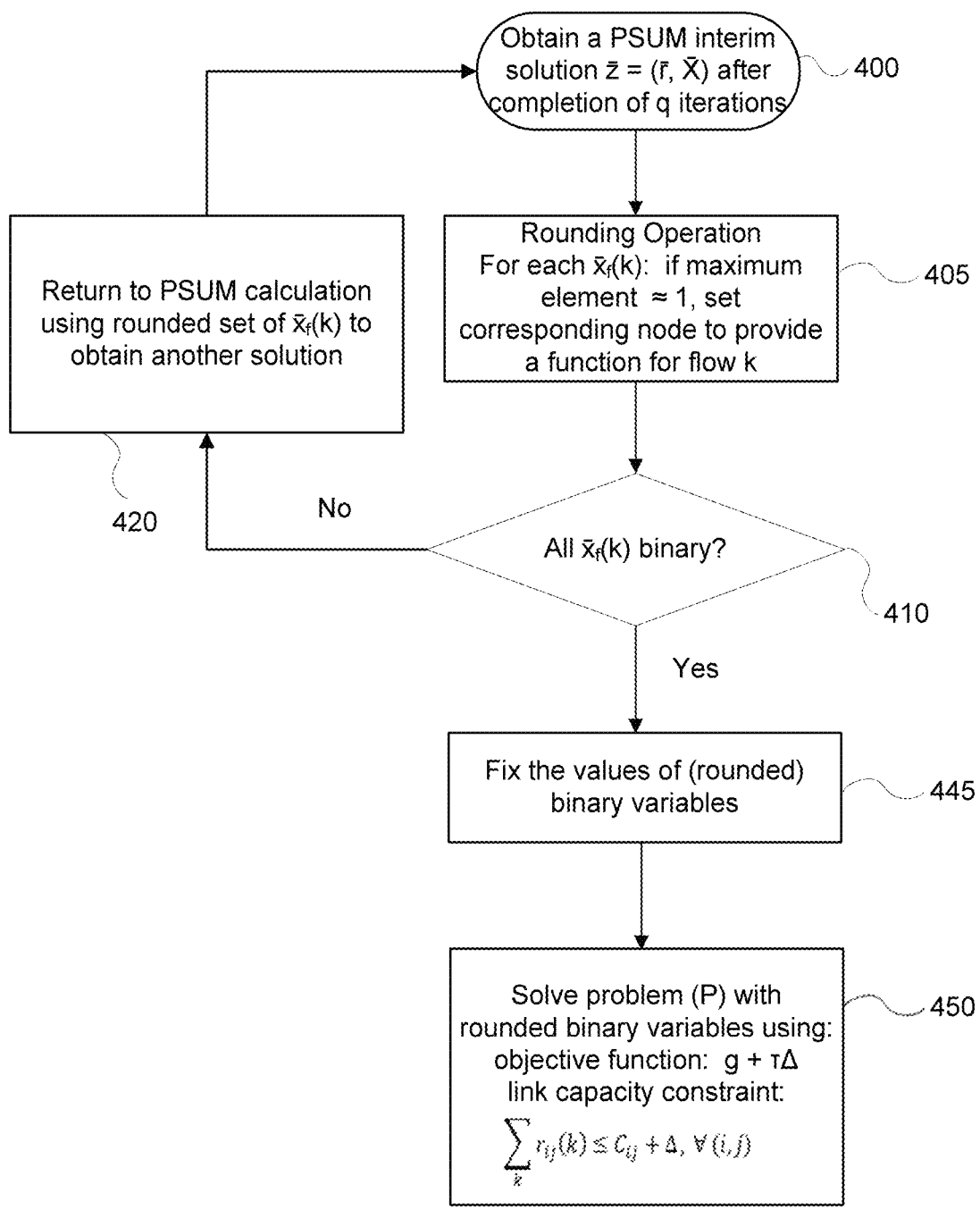

Referring to FIG. 4A, a simplified process flow diagram illustrates an embodiment of a PSUM-R algorithm. In step 400, an interim solution $\bar{z}=(\bar{r}, X^-)$ is obtained after completion of q minimizing iterations of the PSUM algorithm described above and output in step 340 of FIG. 3A. In step 405, the rounding operation of step 355 is performed selectively. In the embodiment of FIG. 4A, for each $\bar{x}_f(k)$: if the maximum element$\approx 1$, the corresponding function node is set to provide a function for flow k (i.e. set $x_{i,f}(k)=1$). In step 445, the rounded binary values are fixed. In step 450, the problem P is solved with the rounded binary variables using:

objective function: $g + \tau \Delta$ link capacity constraint: $\Sigma_k r_{ij}(k) \leq C_{ij} + \Delta, \forall (i,j)$ Referring to FIG. 4B, a simplified process flow diagram illustrates an embodiment of a PSUM-R algorithm. In step 400, an interim solution $\bar{z}=(\bar{r}, X^-)$ is obtained after completion of q minimizing iterations of the PSUM algorithm described above and output in step 340 of FIG. 3A. In step 405, the rounding operation of step 355 is performed selectively. In the embodiment of FIG. 4B, for each $\bar{x}_f(k)$: if the maximum element$\approx 1$, set the corresponding function node to provide a function for flow k (i.e. set $x_{i,f}(k)=1$). In step 410 a test is performed to determine if all $\bar{x}_f(k)$ are now binary values. If all $\bar{x}_f(k)$ are not binary values, then in step 420 the PSUM calculations are iterated using the partially rounded set of $\bar{x}_f(k)$ to obtain another solution (interim or final). If all $\hat{x}_f(k)$ are binary values, then the process continues to steps 445 and 450 described above.

Figure 4C:
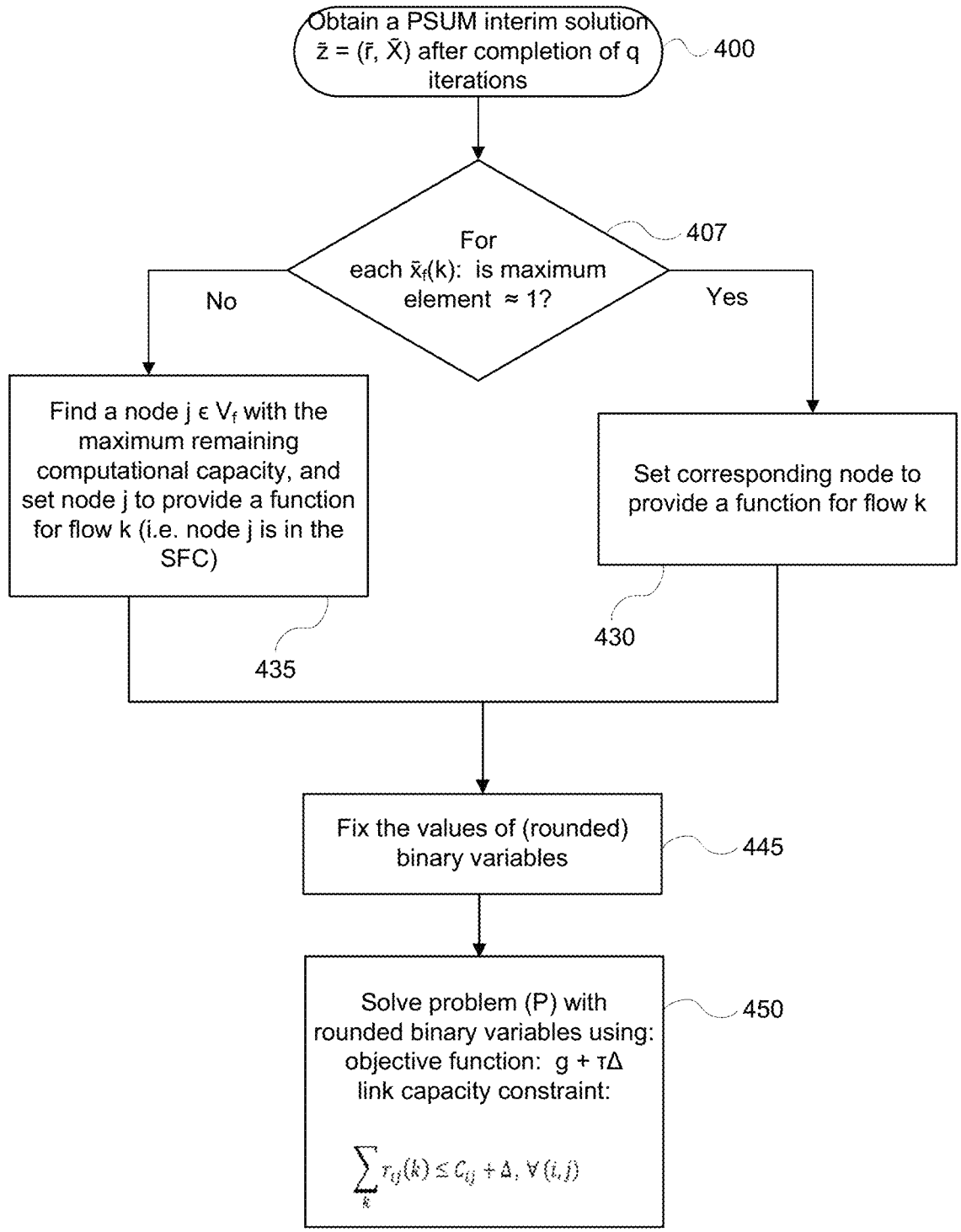

Referring to FIG. 4C, a simplified process flow diagram illustrates an embodiment of a PSUM-R algorithm. In step 400, an interim solution $\bar{z}=(\bar{r}, X^-)$ is obtained after completion of q minimizing iterations of the PSUM algorithm described above and output in step 340 of FIG. 3A. In step 407, each $\bar{x}_f(k)$ is evaluated to determine if the maximum element is $\approx 1$. If the maximum element is $\approx 1$ then in step 430 the corresponding function node is set to provide a function for flow k (i.e. set $x_{i,f}(k)=1$). If the maximum element is not close to 1, then in step 435 an available function node $j \in V_f$ with a maximum remaining computational capacity, as compared with the other available function nodes, is found and function node j is set to provide a function for flow k. With all $\bar{x}_f(k)$ accounted for, the process continues to steps 445 and 450 described above.

Experimental results detailed below were calculated using MATLAB (2013b) executed on server with 2.30 GHz CPUs. The PSUM algorithm was executed using: $q=T_{max}=20$ minimizing iterations, $\sigma_1=2$, $\epsilon_1=0.001$, $\gamma=1.1$, $\eta=0.7$. The PSUM-R algorithm was executed using the embodiment of executing the PSUM algorithm for a pre-defined $q=T_{max}=7$ minimizing iterations, and outputting the interim solution. The embodiment of the PSUM-R algorithm simulated is that described with reference to FIG. 4C.

Figure 5A:
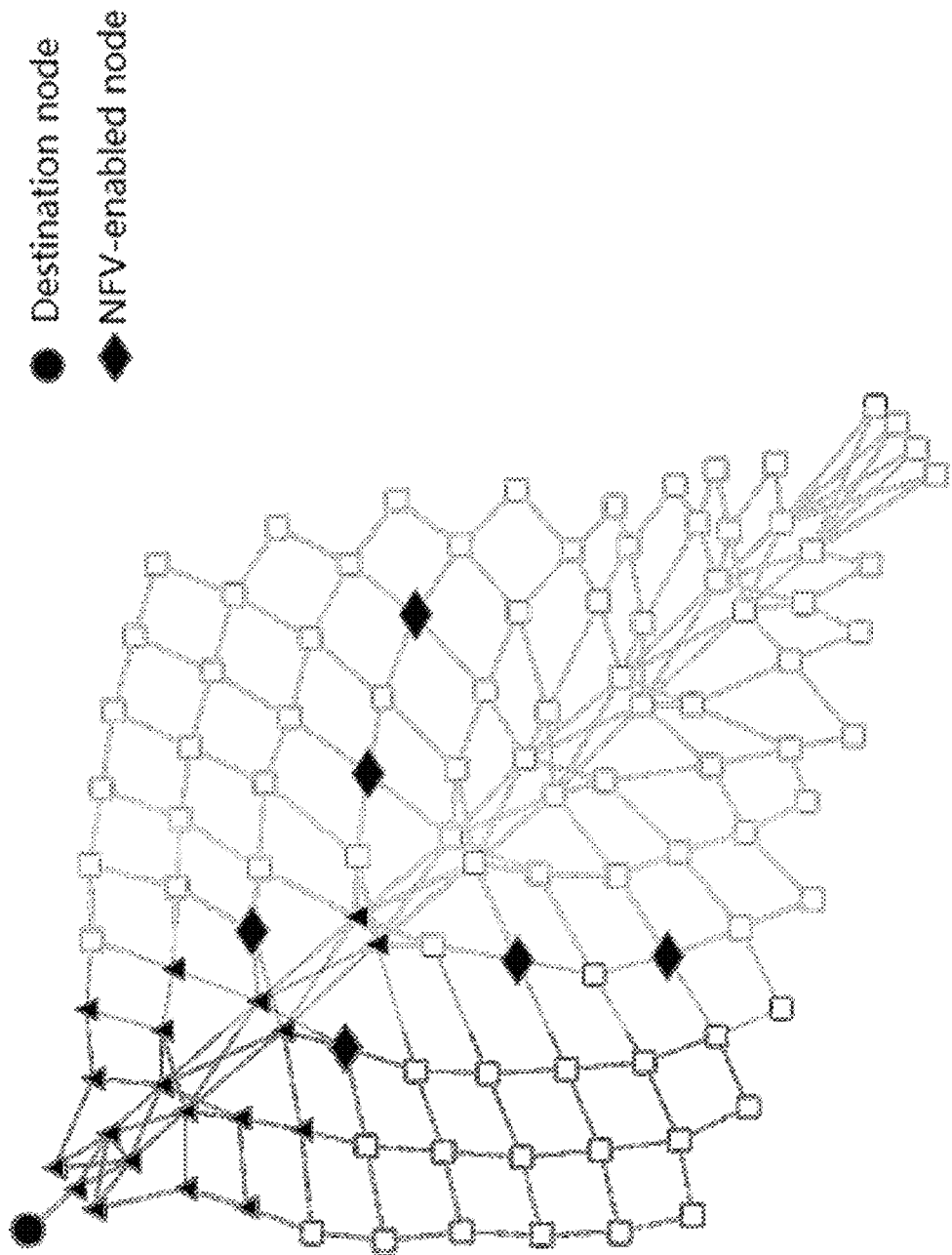
FIG. 5A is a simplified network diagram of an example model network topology.

FIG. 5A is a simplified network diagram of an example model network topology used to simulate performance of embodiments of the invention. In the example, there are 112 network nodes and 440 directed links. The destination node D(k) is fixed, and the source node S(k) is randomly chosen from any one of the square network nodes for each flow of the simulation. Core routers are denoted by black triangles and are not enabled to act as function nodes. Network nodes which are enabled for network function virtualization and to act as function nodes are indicated by black diamonds. The white square nodes are network nodes that transfer flows, but do not act as function nodes.

Figure 5B:
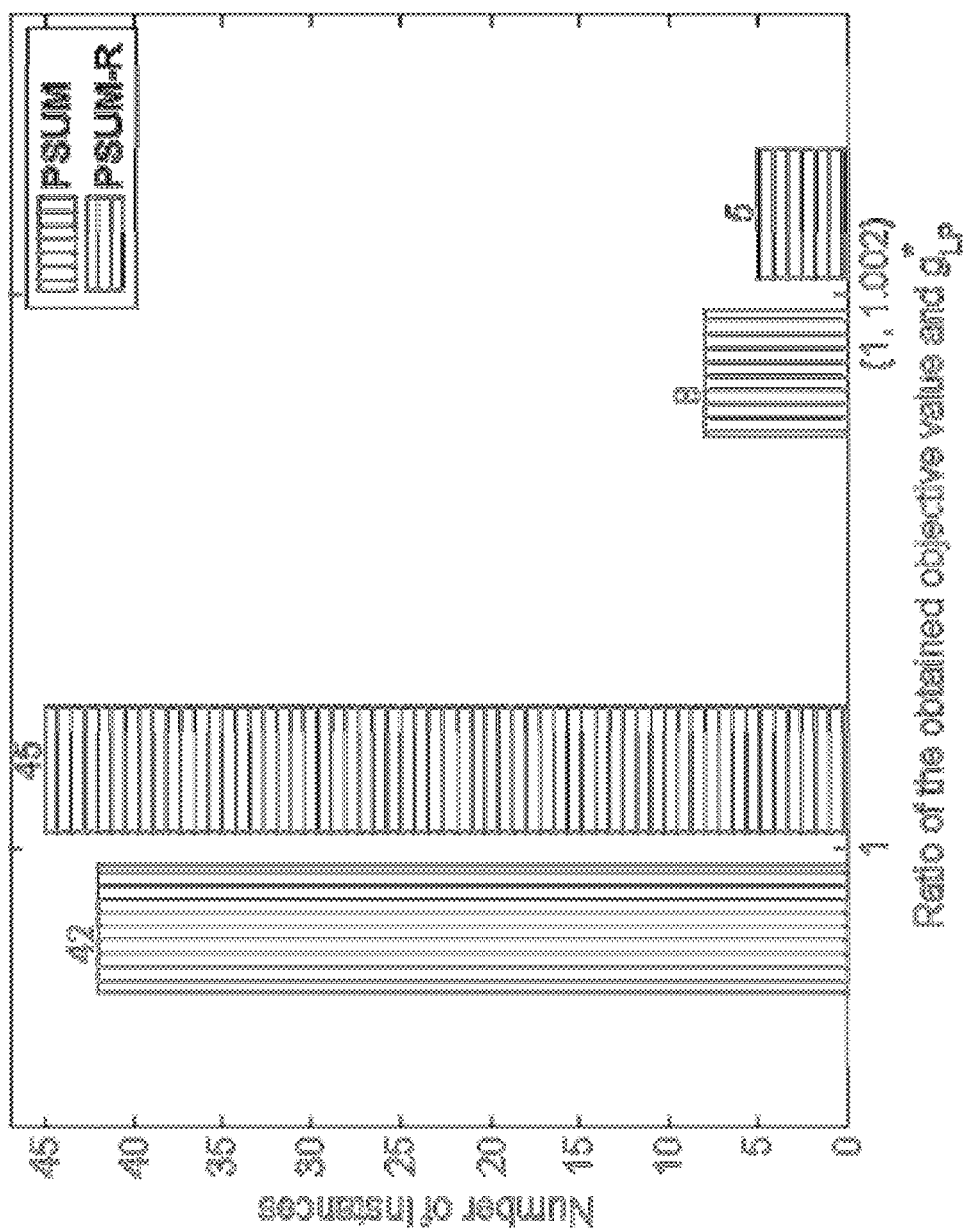
Referring to FIG. 5B, histograms of the ratio between the obtained objective value and the optimal value for the relaxation LP are illustrated for embodiments of both PSUM and PSUM-R with a chain length=1.

Referring to FIG. 5B, histograms of the ratio between the obtained objective value and the optimal value for the relaxation LP are illustrated for both PSUM and PSUM-R with a chain length=1. The simulation was executed with k=20 flows, each with traffic demand $\lambda(k)$ being an integer in [1,5]. Link capacities are integers selected form the set [5, 50], and the node capacity=16. In 42 out of 50 trials, PSUM returned integer solutions with objective values matching the optimal value. In 45 out of 50 trials, PSUM-R returned integer solutions matching the optimal value of the relaxation LP.

Figure 5C:
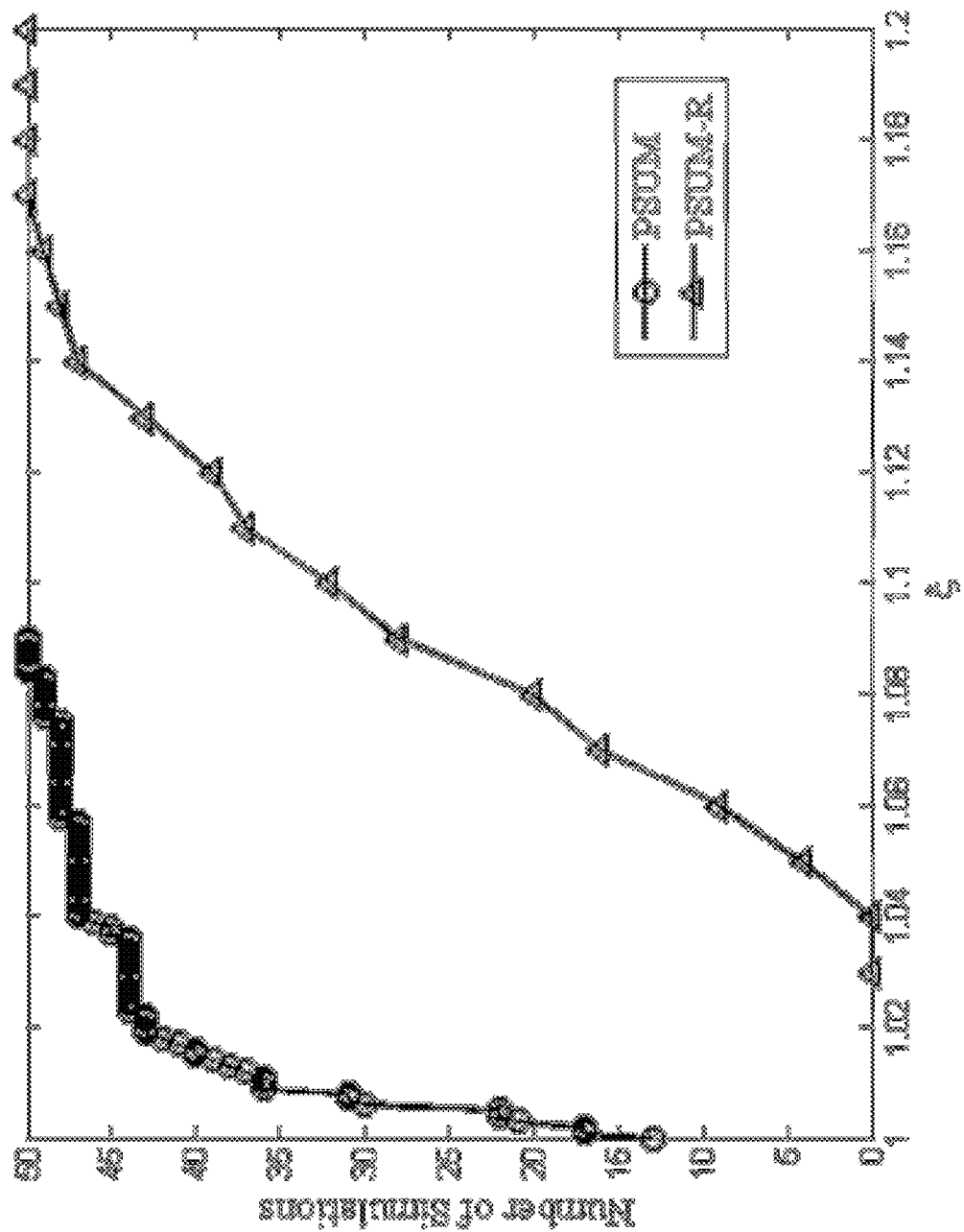
Referring to FIG. 5C, cumulative distribution functions of the ratio between the obtained objective value and the optimal value for the relaxation LP are illustrated for embodiments of both PSUM and PSUM-R with a chain length=2.

Referring to FIG. 5C, cumulative distribution functions of the ratio between the obtained objective value and the optimal value for the relaxation LP are illustrated for both PSUM and PSUM-R with a chain length=2. In 13 out of 50 trials, PSUM returned integer solutions with objective values matching the optimal value of the relaxation LP.

Figure 5D:
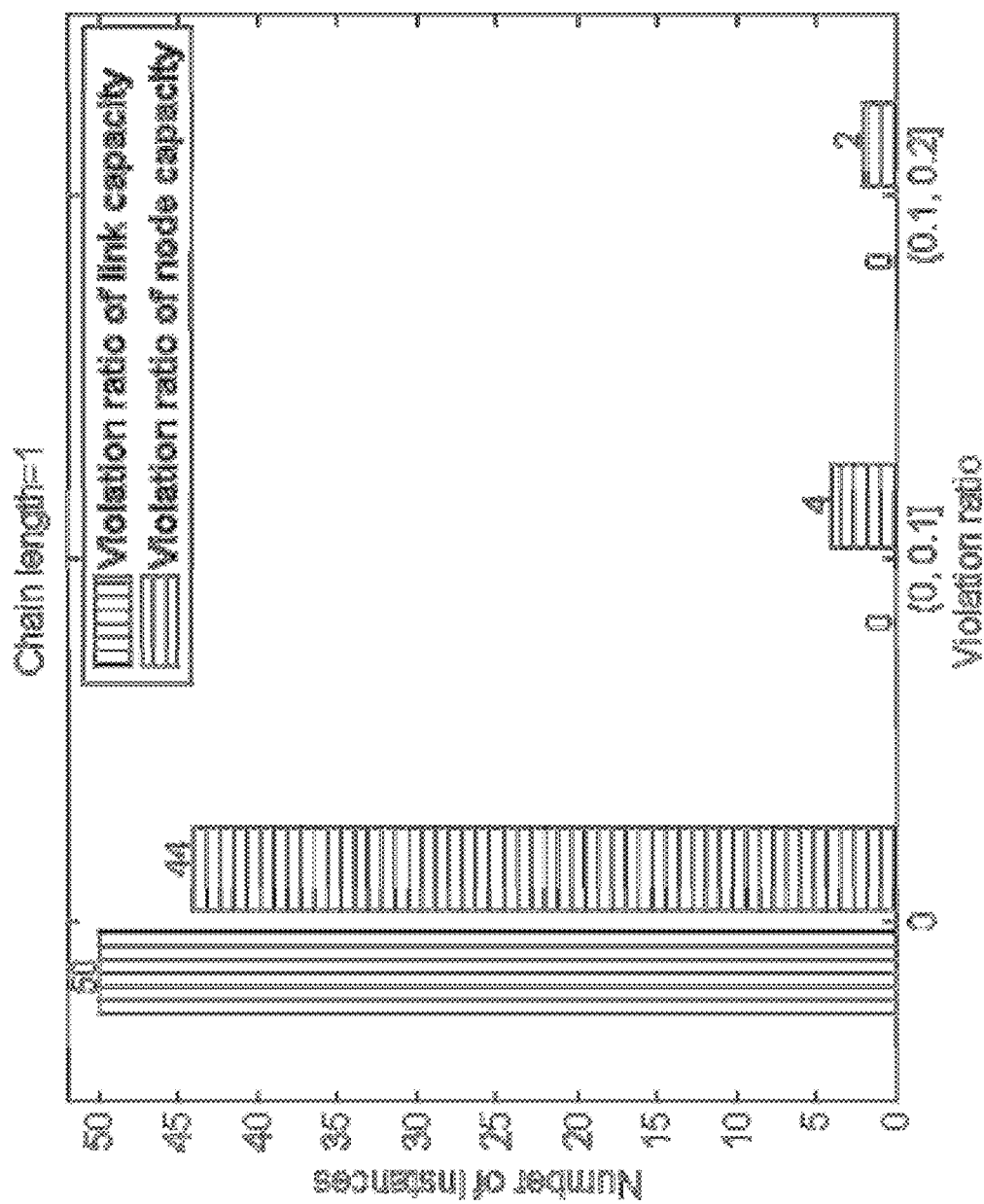
Referring to FIG. 5D, histograms of the link capacity violation ratio and the node capacity violation ratio are illustrated for an embodiment of PSUM-R with a chain length=1.

Referring to FIG. 5D, histograms of the link capacity violation ratio (link capacity violation/link capacity) and the node capacity violation ratio (node capacity violation/node capacity) are illustrated for PSUM-R with a chain length=1.

Figure 5E:
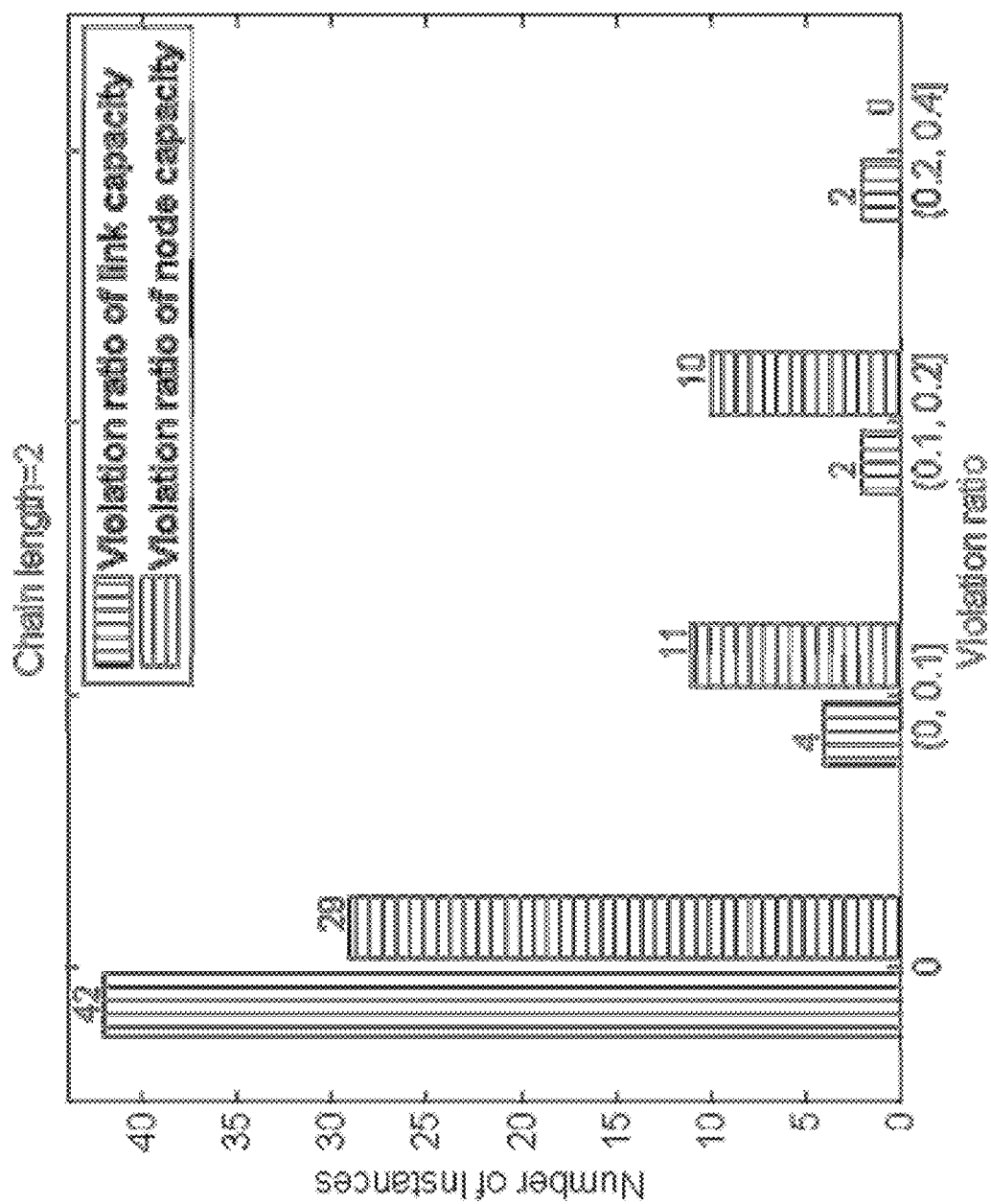
Referring to FIG. 5E, histograms of the link capacity violation ratio and the node capacity violation ratio are illustrated for an embodiment of PSUM-R with a chain length=2.

Referring to FIG. 5E, histograms of the link capacity violation ratio (link capacity violation/link capacity) and the node capacity violation ratio (node capacity violation/node capacity) are illustrated for PSUM-R with a chain length=2.

Figure 5F:
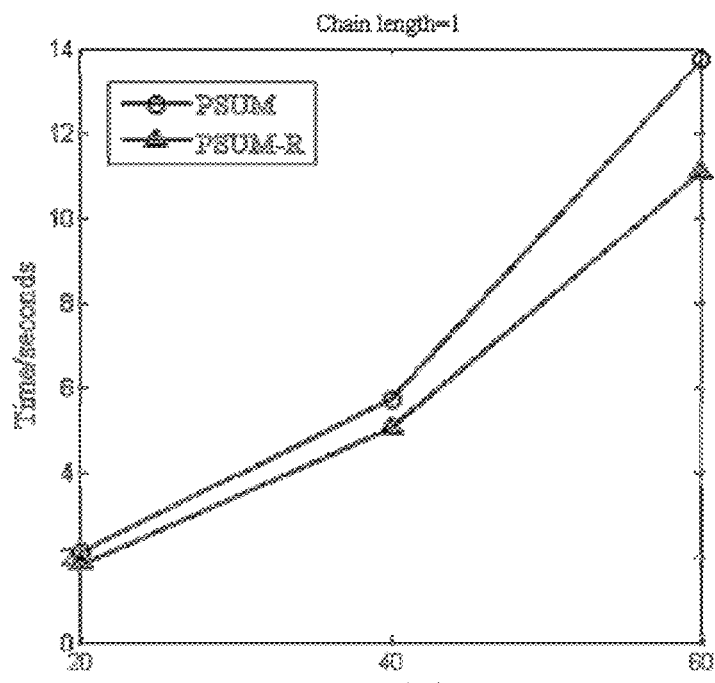
FIG. 5F is a plot of time to compute for varying numbers of flow for embodiments of both PSUM and PSUM-R for a chain length=1.

FIG. 5F is a plot of time to compute for varying numbers of flow for each of PSUM and PSUM-R for a chain length=1.

Figure 5G:
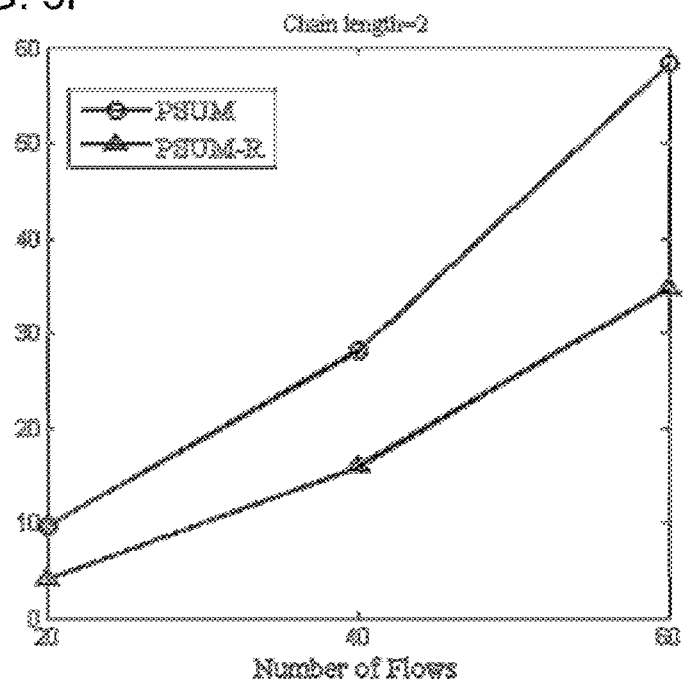
FIG. 5G is a plot of time to compute for varying numbers of flow for embodiments of both PSUM and PSUM-R for a chain length=2.

FIG. 5G is a plot of time to compute for varying numbers of flow for each of PSUM and PSUM-R for a chain length=2.

Figure 6:
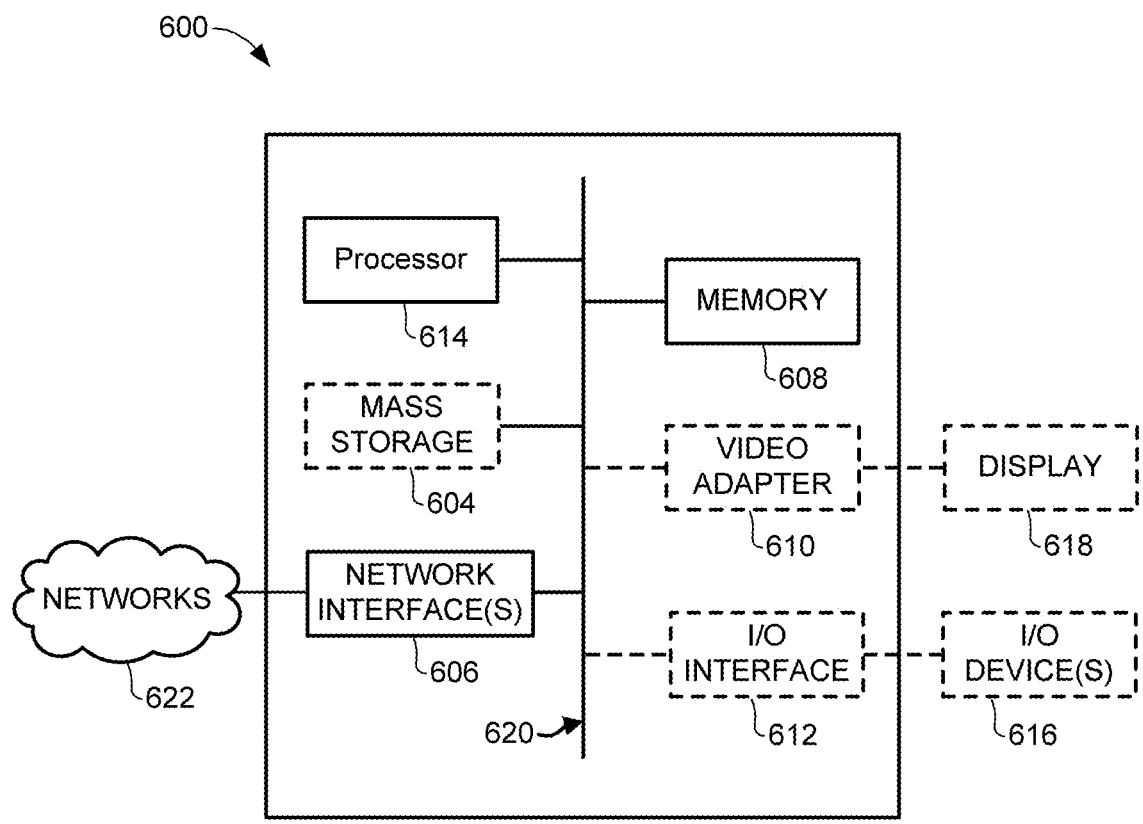
FIG. 6 is a simplified block diagram of an embodiment of a computing system.

FIG. 6 is a simplified block diagram of an embodiment of a computing system 600 that may be used for implementing the devices and methods disclosed herein. In particular, the network nodes may each include one or more computing systems 600. The network functions and scout functions described above may be instantiated by execution by processors on one or more computing systems 600. In some implementations, functions $f_s$ may be instantiated across a plurality of computing systems 600 across a plurality of geographic locations to support requisite network slicing.

Specific devices may utilize all of the components shown or only a subset of the components, and levels of integration may vary from device to device. Furthermore, a device may contain multiple instances of a component, such as multiple processors, memories, transmitters, receivers, etc. The computing system 600 includes a processor 614, a bus 620 and a memory 608, and may optionally also include a mass storage device 604, a video adapter 610, and an I/O interface 612 (shown in dashed lines). The computing system 600 may further include one or more network interface(s) 606 for connecting the computing system 600 to communication networks 622.

The processor 614 may comprise any type of electronic data processor, and may include one or more cores or processing elements. The memory 608 may comprise any type of non-transitory system memory such as static random access memory (SRAM), dynamic random access memory (DRAM), synchronous DRAM (SDRAM), read-only memory (ROM), or a combination thereof. In an embodiment, the memory 608 may include ROM for use at boot-up, and DRAM for program and data storage for use while executing programs. The bus 620 may be one or more of any type of several bus architectures including a memory bus or memory controller, a peripheral bus, or a video bus.

The mass storage 604 may comprise any type of non-transitory storage device configured to store data, programs, and other information and to make the data, programs, and other information accessible via the bus 620. The mass storage 604 may comprise, for example, one or more of a solid state drive, hard disk drive, a magnetic disk drive, or an optical disk drive.

The video adapter 610 and the I/O interface 612 provide optional interfaces to couple external input and output devices to the processing unit 602. Examples of input and output devices include a display 618 coupled to the video adapter 610 and an I/O device 616 such as a keyboard, touch-screen, mouse or other user input device coupled to the I/O interface 612. Other devices may be coupled to the computing system 600, and additional or fewer interfaces may be utilized. For example, a serial interface such as Universal Serial Bus (USB) (not shown) may be used to provide an interface for an external device. Alternatively, the computing system 600 may rely upon the network interface(s) 606 for connection to available mass storage(s), video adapter(s) 610, and I/O interface(s) 612 available on the networks 622.

In some embodiments, a computing system 600 may comprise a standalone server. In other embodiments, the computing system may comprise rack mounted server components networked together for connectivity. In some embodiments, the network functions $f_j$ and/or scout functions $S_i$ described above may be instantiated within a virtualized computing environment supported by one or more computing systems 600.

In some embodiments, a computer program product may be provided. The computer program product including a non-transitory computer readable memory storing computer executable instructions thereon that when executed by at least one processing element of a computing system 600 perform the above described method steps.

Although the present application describes specific features and embodiments, it is evident that various modifications and combinations can be made thereto without departing from the invention. The specification and drawings are, accordingly, to be regarded simply as an illustration as defined by the appended claims, and are contemplated to cover any and all modifications, variations, combinations or equivalents that fall within the scope of those claims.

What is claimed is:

1. A method for determining a network traffic routing path from a source node to a destination node through a service function chain (SFC), the method comprising:
   determining a joint network slicing and traffic engineering problem (P), solution to which identifies network slicing configuration and traffic engineering parameters to provide a set of function nodes, the SFC, and the network traffic routing path from the source node to the destination node;
   solving the joint network slicing and traffic engineering problem by minimizing a resource objective associated with the joint network slicing and traffic engineering problem in accordance with a set of one or more constraints, wherein the joint network slicing and traffic engineering problem is solved by allowing binary variables to take on real values; and,
   transmitting instructions to a network orchestrator to create the SFC in a network slice on the set of function nodes in accordance with the network slicing configuration and the traffic engineering parameters to provide the network traffic routing path.

2. The method of claim 1, wherein the method is performed by at least one processor of a computing resource available on a network.

3. The method of claim 1, wherein the method is performed by a controller network function executed on a computing resource available on a network.

4. The method of claim 3, wherein an identity of at least one of:
   the source node,
   the destination node, or
   a set of available function nodes,
   is provided to a controller by the network orchestrator.

5. The method of claim 1, wherein the joint network slicing and traffic engineering problem comprises a Mixed Integer Linear Program.

6. The method of claim 1, wherein the resource objective comprises at least one of:
   one or more link rates;
   total computational capacity of the set of function nodes in the SFC;
   total communication cost associated with traversing the SFC; or
   minimum number of function nodes in the SFC.

7. The method of claim 1, wherein the resource objective comprises a summation of link rates through the SFC, and wherein an objective function comprises:

$$g(r) = \Sigma_k \Sigma_{ij} r_{ij}(k).$$

8. The method of claim 1, wherein the rate of the flow on the link is
   the rate of the flow k on the link being equal to the sum of the rates of the virtual flows over the link: $r_{ij}(k) = \Sigma_{s=0}^{n} r_{ij}(k, f_s^k)$, and wherein the set of one or more constraints further includes at least one of:
   each function is provided by a single function node: $\Sigma_{i \in V_f} x_{i,j}(k) = 1$;
   a link capacity constraint: $\Sigma_k r_{ij}(k) \leq c_{ij}$;
   a node capacity constraint;
   a second node capacity constraint expressed as a limit on a data rate $\lambda(k)$ for flows processed by the single function node: $\Sigma_k \Sigma_j x_{i,j}(k) \lambda(k) \leq \mu_i$; or
   a flow conservation constraint at one or more of: the source node: $\Sigma_j r_{s(k)j}(k, f_0^k) = \lambda(k)$, the destination node: $\Sigma_j r_{jD(k)}(k, f_n^k) = \lambda(k)$, or flow conservation constraints at adjacent nodes in the SFC: $\Sigma_j r_{ji}(k, f_{s-1}^k) - \Sigma_j r_{ij}(k, f_{s-1}^k) = x_{i,f_s^k}(k)\lambda(k)$, or $\Sigma_j r_{ji}(k, f_s^k) - \Sigma_j r_{ij}(k, f_s^k) = -x_{i,f_s^k}(k)\lambda(k)$.

9. The method of claim 1, wherein the joint network slicing and traffic engineering problem is solved by adding a penalty term:

$$P_\epsilon(\bar{x}) = \Sigma_k \Sigma_{f \in F(k)}(\|\bar{x}_f(k) + \epsilon \bar{1}\|_p^p - c_{\epsilon,f}).$$

10. The method of claim 9, wherein the penalty term is differentiable and has a minimum value of 0.

11. The method claim 1, wherein the minimizing the resource objective is complete, based on satisfaction of at least one of:
Tmax minimization iterations have been performed;
when one or more real variables of the joint network slicing and traffic engineering problem have been resolved to binary components;
when the one or more real variables of the joint network slicing and traffic engineering problem have been resolved to values close to a binary component binary components; or
when the one or more real variables of the joint network slicing and traffic engineering problem have been resolved to values within a pre-defined range of a binary component.

12. The method of claim 1, wherein solving the joint network slicing and traffic engineering problem comprises:
relaxing the joint network slicing and traffic engineering problem by allowing binary variables to assume real values and adding a penalty term to an objective;
solving the relaxed and penalized problem to generate $X^t$;
calculating an iteration of a (PSUM) subproblem $\nabla P_\epsilon (X^t)^T X$;
solving the (PSUM) subproblem $\nabla P_\epsilon(X^t)^T X$; and
checking to determine if an algorithm is complete and if it is not complete calculating a next iteration of the (PSUM) subproblem $\nabla P_\epsilon(X^t)^T X$, and if the algorithm is complete, outputting a complete solution.

13. The method of claim 1, wherein the set of one or more constraints includes a rate of a flow on a link being equal to a sum of rates of virtual flows over the link.

14. A computing system operative to determine a network traffic routing path from a source node to a destination node through a service function chain (SFC), the computing system comprising:
at least one processor;
a non-transitory memory for storing programming instructions that, when executed by the at least one processor, cause the computing system to:
determine a joint network slicing and traffic engineering problem (P), solution to which identifies network slicing configuration and traffic engineering parameters to provide a set of function nodes, the SFC, and the network traffic routing path from the source node to the destination node;
solve the joint network slicing and traffic engineering problem by minimizing a resource objective associated with the joint network slicing and traffic engineering problem in accordance with a set of one or more constraints, wherein the joint network slicing and traffic engineering problem is solved by allowing binary variables to take on real values; and,
transmit instructions to a network orchestrator to create the SFC in a network slice on the set of function nodes in accordance with the network slicing configuration and the traffic engineering parameters to provide the network traffic routing path.

15. The computing system of claim 14, wherein an identity of at least one of:
the source node,
the destination node, or
a set of available function nodes, is provided by the network orchestrator available on a network.

16. The computing system of claim 14, wherein the joint network slicing and traffic engineering problem comprises a Mixed Integer Linear Program.

17. The computing system of claim 14, wherein the resource objective comprises at least one of:
one or more link rates;
total computational capacity of the set of function nodes in the SFC;
total communication cost associated with traversing the SFC; or
minimum number of function nodes in the SFC.

18. The computing system of claim 14, wherein the resource objective comprises a summation of link rates through the SFC, and wherein an objective function comprises:

$$g(r) = \Sigma_k \Sigma_{ij} r_{ij}(k).$$

19. The computing system of claim 14, wherein the rate of the flow on the link is
the rate of the flow k on the link being equal to the sum of the rates of the virtual flows over the link: $r_{ij}(k) = \Sigma_{s=0}^n r_{ij}(k, f_s^k)$, and wherein the set of one or more constraints further includes at least one of:
each function is provided by a single function node: $\Sigma_{i \in V_f} x_{i,f}(k) = 1$;
a link capacity constraint: $\Sigma_k r_{ij}(k) \leq c_{ij}$;
a node capacity constraint;
a second node capacity constraint expressed as a limit on a data rate $\lambda(k)$ for flows processed by the single function node: $\Sigma_k \Sigma_f x_{i,f}(k)\lambda(k) \leq \mu$; or
a flow conservation constraint at one or more of: the source node: $\Sigma_j r_{s(k)j}(k, f_0^k) = \lambda(k)$, the destination node: $\Sigma_j r_{jD(k)}(k, f_n^k) = \lambda(k)$, or flow conservation constraints at adjacent nodes in the SFC: $\Sigma_j r_{ji}(k, f_{s-1}^k) - \Sigma_j r_{ij}(k, f_{s-1}^k) = x_{i,f_s^k}(k)\lambda(k)$, or $\Sigma_j r_{ji}(k, f_s^k) - \Sigma_j r_{ij}(k, f_s^k) = -x_{i,f_s^k}(k)\lambda(k)$.

20. The computing system of claim 14, wherein the joint network slicing and traffic engineering problem is solved by adding a penalty term: $P_\epsilon(\bar{x}) = \Sigma_k \Sigma_{f \in F(k)}(\|\bar{x}_f(k) + \epsilon \bar{1}\|_p^p - c_{\epsilon,f})$.

21. The computing system of claim 20, wherein the penalty term is differentiable and has a minimum value of 0.

22. The computing system of claim 14, wherein minimizing the resource objective is complete, based on satisfaction of at least one of:
Tmax minimization iterations have been performed;
when one or more real variables of the joint network slicing and traffic engineering problem have been resolved to binary components;
when the one or more real variables of the joint network slicing and traffic engineering problem have been resolved to values close to a binary component binary components; or
when the one or more real variables of the joint network slicing and traffic engineering problem have been resolved to values within a pre-defined range of a binary component.

23. The computing system of claim 14, wherein the computing system is operative to solve the joint network slicing and traffic engineering problem by:
relaxing the joint network slicing and traffic engineering problem by allowing binary variables to assume real values and adding a penalty term to an objective;

solving the relaxed and penalized problem to generate $X^t$;

calculating an iteration of a (PSUM) subproblem $\nabla P_\epsilon(X^t)^T X$;

solving the (PSUM) subproblem $\nabla P_\epsilon(X^t)^T X$; and checking to determine if an algorithm is complete and if it is not complete calculating a next iteration of the (PSUM) subproblem $\nabla P_\epsilon(X^t)^T X$, and if the algorithm is complete, outputting a complete solution.

24. The computing system of claim 14, wherein the set of one or more constraints includes a rate of a flow on a link being equal to a sum of rates of virtual flows over the link.

* * * * *